UNITED STATES PATENT OFFICE.

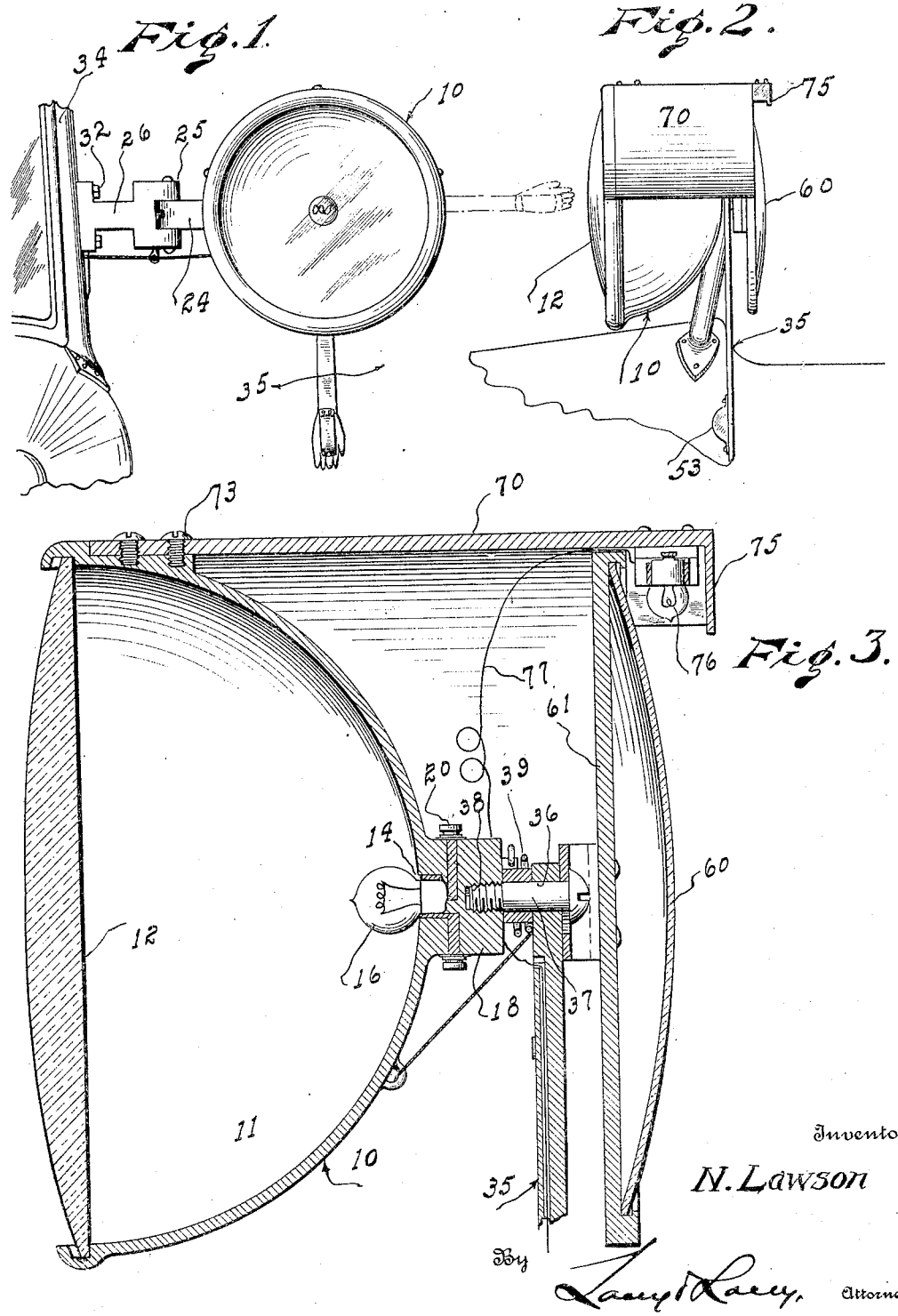

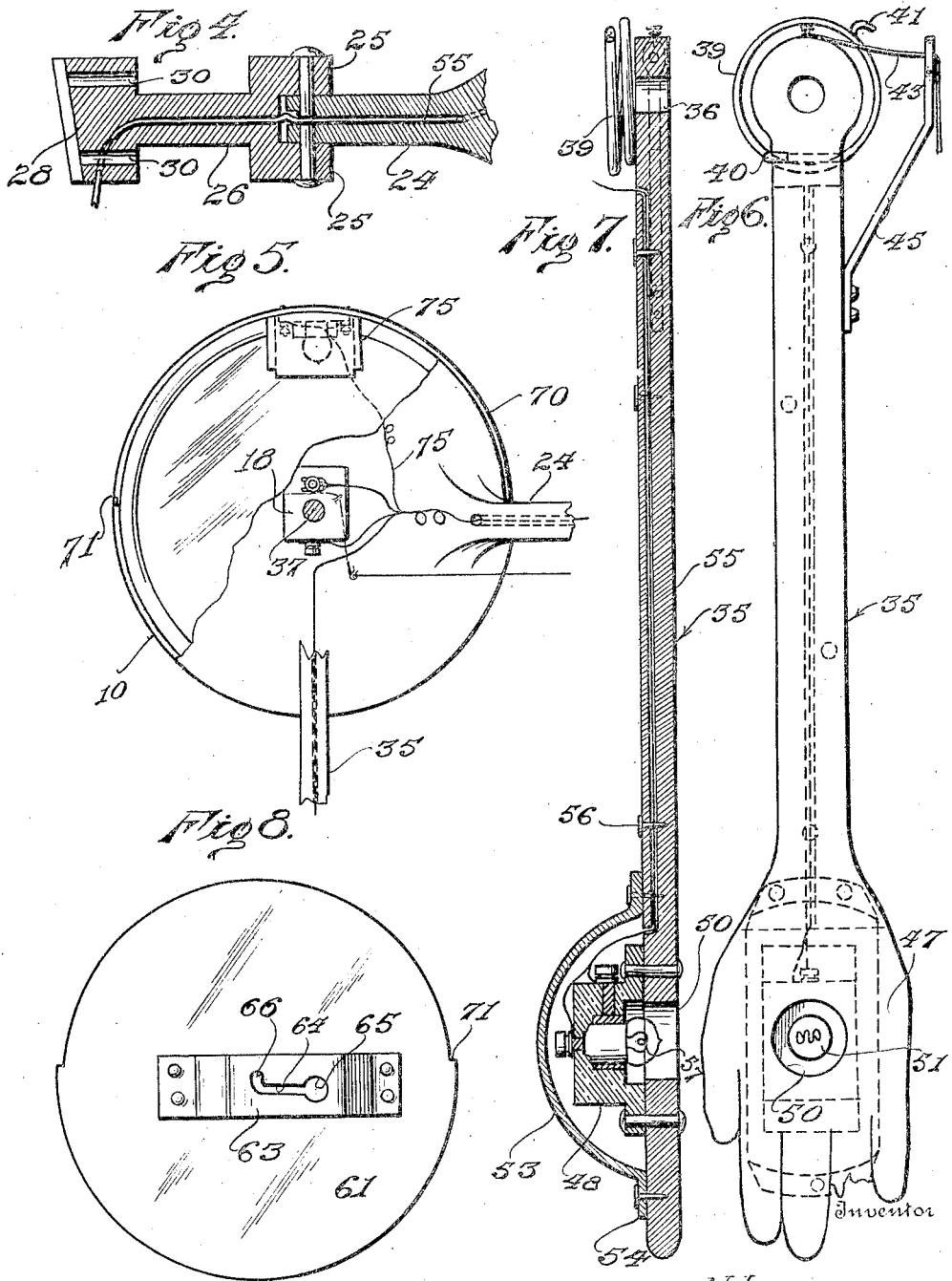

NEAL LAWSON, OF SANTA BARBARA, CALIFORNIA.

VEHICLE-LIGHT.

1,382,203.

Specification of Letters Patent. Patented June 21, 1921.

Application filed November 3, 1920. Serial No. 421,563.

*To all whom it may concern:*

Be it known that I, NEAL LAWSON, a citizen of the United States, residing at Santa Barbara, in the county of Santa Barbara and State of California, have invented certain new and useful Improvements in Vehicle-Lights, of which the following is a specification.

This invention relates to improvements in lights especially adapted for use on motor vehicles though not necessarily restricted to such use.

An important object of this invention is to provide a spot light for motor vehicles having a horizontally pivoted indicator arm adapted to be swung to an extended position to indicate the intention of the operator of changing his direction of travel.

A further object of the invention is to provide a spot light having an indicator arm provided with novel means whereby the same may be illuminated so that its use at night will be rendered effective.

A still further object of the invention is to provide a spot light provided at is rear side with a mirror so that objects at the rear of the vehicle may be viewed by the operator through the mirror.

A further object of the invention is to provide a spot light having simple means whereby the mirror at the rear side of the same may be illuminated at night.

A further object of the invention is to provide a spot light which is simple to operate, desirable in use and cheap to manufacture.

Other objects and advantages of the invention will be apparent during the course of the following description.

In the accompanying drawings forming a part of this application and in which like numerals are employed to designate like parts throughout the same, Figure 1 is a front elevation of the improved spot light applied, Fig. 2 is a side elevation of the same applied, Fig. 3 is a central vertical detail sectional view through the spot light, Fig. 4 is a detail sectional view through the attaching means for the spot light, Fig. 5 is a fragmentary rear elevation of the spot light, parts being broken away, Fig. 6 is an elevation of the indicator arm embodied in the invention, Fig. 7 is a central vertical longitudinal sectional view through the indicator arm illustrated in Fig. 6, Fig. 8 is a rear elevation of the mirror embodied in the invention, the view illustrating the attaching means for the same.

In the drawings wherein for the purpose of illustration is shown a preferred embodiment of the invention, the numeral 10 generally designates a spot light which comprises a reflector 11 arranged rearwardly of a lens 12 of any desired type.

As illustrated in Fig. 3, the light is provided with a socket 14 which receives the attaching portion of a bulb 16 arranged in the reflector. The lamp is formed with what might be termed a head 18 having conductors 20 adapted for connection with the bulb and having connection by means of wires with a source of electric energy.

The light is supported by means of a laterally projecting arm 24 which is secured between the alined apertured ears 25 of an attaching bracket 26. With references to Figs. 1 and 4, it will be noted that the bracket 26 is provided with an attaching flange 28 having apertures 30 adapted for the reception of fastening devices 32 which are adapted to be secured to one standard of a windshield 34 or other part of the vehicle. However, the bracket 26 may be in the form of a two-part clamp adapted to be secured to any convenient place on the vehicle by means of suitable fastening devices.

An indicator arm 35 may be arranged in the rear of the reflector and is provided at its rear end with an aperture 36 adapted for the reception of a screw bolt 37 which is threaded into a socket 38 formed in the head 18. The indicator arm is, of course, capable of swinging movement on the screw bolt 37 and is normally held in a downward or inoperative position by means of a coil spring 39 having one end portion 40 hooked about the indicator arm and the other end portion 41 engaged with the head 18 by any suitable means. Swinging movement may be imparted to the indicator arm 35 by means of a flexible element 43 which is secured to the rear end of the arm and extends through a guiding bracket 45 carried by one side of the arm and terminating at a point spaced to one side of the pivot bolt 37. In carrying out the invention, the flexible element 43 may be placed within convenient reach of the vehicle operator so that the same may be pulled for swinging the arm upwardly. If desired the cable may be attached to the steering post of the vehicle.

The forward portion of the indicator arm 35 is provided with a hand 47 which carries a bulb socket 48 on its rear side. The hand is provided with an opening 50 which receives a bulb 51 so that when the bulb is employed at night the same may be readily seen. A housing 53 may be extended over the socket 48 and is secured to the rear end by means of an attaching flange 54.

Current is supplied to the bulb 51 through electric wires 55 which are disposed between the opposed sides of the sections of the arms which are held together by means of fastening devices 56. In other words, the arm 35 consists of a pair of sections having their opposed sides formed with grooves to provide a passage for the wires 55. The feed wires 55 may extend through the bracket 26 and the attaching arm 24, the same as do the feed wires of the bulb 16. A mirror 60 may be arranged rearwardly of the reflector and is provided with a backing plate 61 to which an attaching plate 63 is connected. As illustrated in Fig. 3, the major portion of the attaching plate is spaced from the backing plate 61 and is provided with an L-shaped slot 64 adapted for the reception of the shank of the screw bolt 37. One end portion of the slot 64 is enlarged as indicated at 65 so as to permit the head of the screw bolt 37 to pass through the slot. In attaching the mirror to the screw bolt, the head of the screw bolt is passed through the enlarged end 65 of the slot 64 and the plate is then moved laterally so that the shank is positioned within the branch 66 of the slot. Upon arranging the mirror in place, a semicircular shield 70 may be arranged about the upper portion of the reflector and the mirror so as to firmly secure the mirror against movement. The edge portion of the mirror is provided at diametrically opposite points with shoulders 71 which engage the lower edges of the shield whereby accidental rotation of the mirror is prevented. The shield 70, which may be of any desired material, is curved to conform to the curvature of the lamp and is secured to the same by means of screw bolts 73. A reflector 75 is carried by the shield rearwardly of the mirror and is provided with a bulb 76 adapted for illuminating the mirror at night. The bulb may be provided with electrical energy by means of feed wires 77 which are extended within the shield and through the laterally projecting arm 24. A further function of the shield 70 is to conceal the attaching plate 63, the screw bolt 37 and the several parts of the head 18 from the eye. This greatly adds to the appearance of the device and also protects the same from the rain.

In the practice of the invention, the light may be supported at one side of the vehicle within convenient reach of the operator with the flexible element 43 extended to a point adjacent the operator, so that the arm may be swung to a horizontal or operative position when desired. The several lights of the device may all be illuminated at night so that the mirror and the signal arm may be employed at night without inconvenience. If desired, electrical means may be employed in lieu of the means illustrated for operating the signal arm 35.

It is to be understood that the form of the invention herein shown and described is to be taken as a preferred embodiment of the same and that such minor changes in arrangement and construction of parts may be made as will remain within the spirit of the invention and the scope of what is claimed.

Having thus described the invention, what is claimed as new is:

1. The combination with a support having illuminating means, of an indicator arm pivotally carried by the support in rear of the illuminating means thereon, illuminating means housed in the outer portion of said indicator arm, means for operating said indicator arm, and a shield secured to the support and extending rearwardly therefrom over the indicator arm.

2. The combination with a support, and a light mounted thereon, of a screw bolt carried by the support, an indicator arm swingingly mounted on said screw bolt in rear of the light, spring means for normally holding said indicator arm in an inoperative position, a flexible element connected to said indicator arm, and a bracket carried by said indicator arm and spaced laterally of said screw bolt, the flexible element passing through and guided by the bracket.

3. The combination with a support having a head, a pivot element carried by said head, an indicator arm mounted on said element, and a shield carried by said support and extending over said head and said pivot element.

4. The combination with a support having a head, a pivot element carried by said head, an indicator arm mounted on said element, a shield carried by said support and extending over said head and said pivot element, a mirror supported by said pivot element in rear of the indicator arm and engaged with said shield, a reflector carried by the rear end of the shield, and a light housed between the shield and said reflector to play on the mirror.

5. The combination with a support having a head, a pivot element carried by said head, an indicator arm mounted on said element, a shield carried by said support and extending over said head and said pivot element, and a mirror supported by said pivot element in rear of the indicator arm and engaged with said shield.

6. The combination with a support having a head, a pivot element carried by said head, an indicator arm mounted on said pivot element, a shield carried by said support and extending over said head and said pivot element, and a mirror supported by said pivot element in the rear of the indicator arm and engaged with said shield, said shield being provided with illuminating means in rear of the mirror.

7. The combination with a support, of a pivot element carried by said support, an indicator arm connected to said pivot element, a coil spring surrounding said pivot element and having connection with said indicator arm for normally retaining the same in an inoperative position, a mirror having a backing provided with an attaching plate secured to said pivot element, and a semicircular shield extending over said support and said mirror and concealing said coil spring and said pivot element.

8. The combination with a support, of a pivot element carried by said support, an indicator arm connnected to said pivot element, a coil spring surrounding said pivot element and having connection with said indicator arm for normally retaining the same in an inoperative position, a mirror having a backing provided with an attaching plate secured to said pivot element, and a semicircular shield extending over said support and said mirror and concealing said coil spring and said pivot element, said mirror being provided with oppositely arranged shoulders engaging the adjacent portions of the shield whereby the mirror is held securely in position.

In testimony whereof I affix my signature.

NEAL LAWSON. [L. S.]